(12) United States Patent
Yang et al.

(10) Patent No.: US 9,483,088 B2
(45) Date of Patent: Nov. 1, 2016

(54) METHOD FOR ASSEMBLING A TOUCH CONTROL DISPLAY APPARATUS AND THE TOUCH CONTROL DISPLAY APPARATUS

(71) Applicant: Wistron Corporation, Hsichih Dist., New Taipei (TW)

(72) Inventors: Shih-Ming Yang, New Taipei (TW); Wen-Yuan Liao, New Taipei (TW); Chen-Yu Liu, New Taipei (TW); Yu-Yi Chen, New Taipei (TW); Chun-Ming Wu, New Taipei (TW); Jen-Hao Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 84 days.

(21) Appl. No.: 14/173,763

(22) Filed: Feb. 5, 2014

(65) Prior Publication Data
US 2015/0049029 A1 Feb. 19, 2015

(30) Foreign Application Priority Data
Aug. 14, 2013 (TW) .............................. 102129128 A (51) Int. Cl.
*G06F 1/18* (2006.01)
*G06F 1/16* (2006.01)

(52) U.S. Cl.
CPC .............. *G06F 1/181* (2013.01); *G06F 1/1626* (2013.01); *G06F 2203/04103* (2013.01); *Y10T 29/49002* (2015.01)

(58) Field of Classification Search
CPC ......... G06F 3/041; G06F 3/038; G06F 3/043
See application file for complete search history.

(56) References Cited

U.S. PATENT DOCUMENTS

2011/0148784 A1*  6/2011  Lee ...................... G06F 1/1601
                                                    345/173
2012/0162143 A1*  6/2012  Kai ...................... G06F 1/1626
                                                    345/177

FOREIGN PATENT DOCUMENTS

| JP | 1998-207630 A | 8/1998 |
| JP | 2011-215867 A | 10/2011 |
| TW | 201123115 A1 | 7/2011 |

OTHER PUBLICATIONS

The Office Action issued to Taiwanese Counterpart Application No. 102129128 by the Taiwan Intellectual Property Office on Jan. 23, 2015 along with an English translation of sections boxed in red.

* cited by examiner

*Primary Examiner* — Michael Faragalla
(74) *Attorney, Agent, or Firm* — Jianq Chyun IP Office (57) ABSTRACT

A method for assembling a touch control display apparatus includes: mounting a frame member to an assembly surface of a touch control panel; fixing a display panel to one of the frame member and the assembly surface of the touch control panel such that a display surface of the display panel faces the touch control panel; mounting at least one electronic component on a section of the frame member that is not covered by the display panel; and coupling a bottom case to the frame member for enclosing the display panel and the at least one electronic component.

17 Claims, 9 Drawing Sheets

FIG. 11

METHOD FOR ASSEMBLING A TOUCH CONTROL DISPLAY APPARATUS AND THE TOUCH CONTROL DISPLAY APPARATUS

CROSS-REFERENCE TO RELATED APPLICATION

This application claims priority of Taiwanese Patent Application No. 102129128, filed on Aug. 14, 2013.

BACKGROUND OF THE INVENTION

1. Field of the Invention

The invention relates to an assembly method and a structure of a display apparatus, more particularly to an assembly method and a structure of a touch control display apparatus for effectively reducing maintenance cost thereof.

2. Description of the Related Art

Existing assembly methods for a touch control display apparatus of an electronic device, such as a tablet PC, a notebook computer with touch control functionality, etc., are performed by coupling electronic components, such as a circuit board, an antenna, a speaker, a microphone, a video camera, etc., to a bottom case as a first step, followed by fixedly mounting a display panel thereto and gluing a touch control panel with protective glass on the display panel, or alternatively followed by coupling through a special mechanism a touch control module to the bottom case instead, where the touch control module consists of a display panel and a touch control panel that are glued together, such that the front side of the electronic device form an aesthetic, closed and flat plane.

However, if any defect (such as circuit wiring alignment error) takes place during the assembly process or a malfunction occurs during use, such that repair and/or replacement of the electronic components is needed, the touch control panel or the touch control module often needs to be removed by a special tool or equipment before repair/replacement can take place, making the procedure rather complicated and prone to damage. In addition, a clean room environment is also required for performing the dismantling operation to prevent damage to the touch control panel or touch control module. Based on the existing assembly method, even if the touch control panel or the touch control module does not need repair or replacement, a clean room environment is still required, which results in complex maintenance procedure and high maintenance cost.

SUMMARY OF THE INVENTION

Therefore, the object of the present invention is to provide an assembly method for a touch control display apparatus that can eliminate the aforesaid drawbacks of the prior art.

According to one aspect of the present invention, there is provided a method for assembling a touch control display apparatus, comprising the steps of:

(S1) mounting a frame member to an assembly surface of a touch control panel;

(S2) fixing a display panel to one of the frame member and the assembly surface of the touch control panel such that a display surface of the display panel faces the touch control panel;

(S3) mounting at least one electronic component on a section of the frame member that is not covered by the display panel; and (S4) coupling a bottom case to the frame member to enclose the display panel and the at least one electronic component.

According to another aspect of the present invention, there is provided a touch control display apparatus including a frame member, a touch control panel, a display panel, at least one electronic component and a bottom case. The touch control panel has an assembly surface that is mounted to the frame member. The display panel has a display surface that faces the touch control panel and that is fixed on one of the assembly surface of the touch control panel and the frame member. The at least one electronic component is mounted on a section of the frame member that is not covered by the display panel. The bottom case is coupled to the frame member for enclosing the display panel and the at least one electronic component.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

Referring to FIGS. 1, 2, 3 and 6, the preferred embodiment of a touch control display apparatus 100 according to the present invention includes a frame member 1, a touch control panel 2, a display panel 3, a pivot axle 4, a bottom case 5, a decorating cover plate 6, and a plurality of electronic devices such as antennas 71, a circuit board 72 and a CCD camera 73. The frame member 1 is a rectangular frame, and defines an outer surface 11 that is adjacent to the touch control panel 2 and an inner surface 12 that is distal from the touch control panel 2. The inner surface 12 has a first section 121 and a second section 122 disposed at respective short sides of the frame member 1, and a third section 123 and a fourth section 124 disposed at respective long sides of the frame member 1. The touch control panel 2 includes a contact surface 21 for touch control operations and an assembly surface 22 opposite to the contact surface 21. The display panel 3 includes a display surface 31 and an inner surface 32 (see FIG. 4) opposite to the display surface 31.

Figure 9:
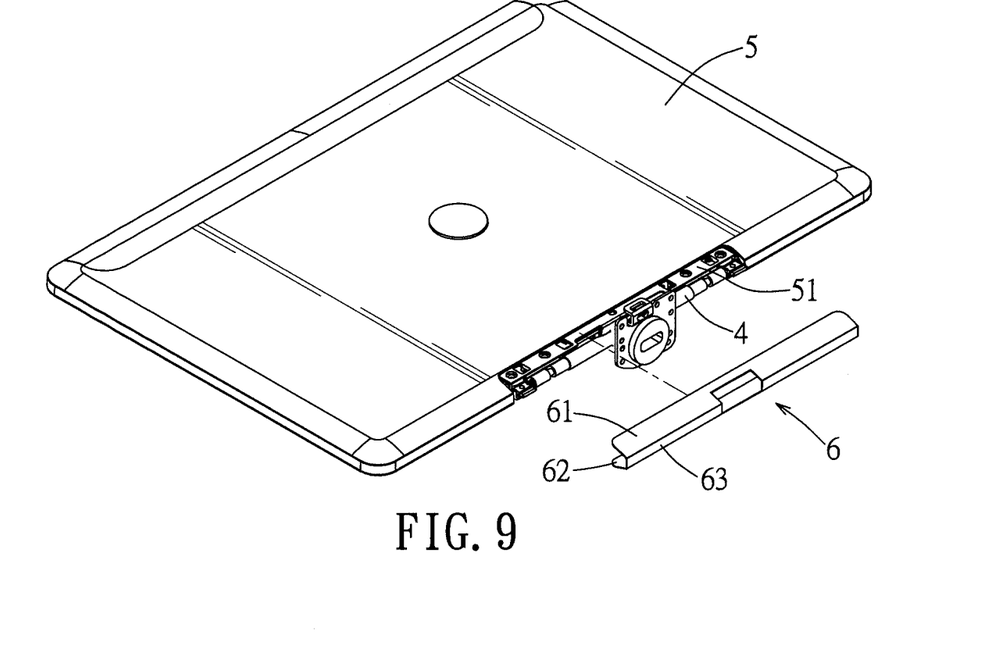
FIG. 9 is a partly exploded perspective view of the touch control display apparatus for illustrating a step of mounting a decoration cover plate to the bottom case of the assembly method.
Figure 10:
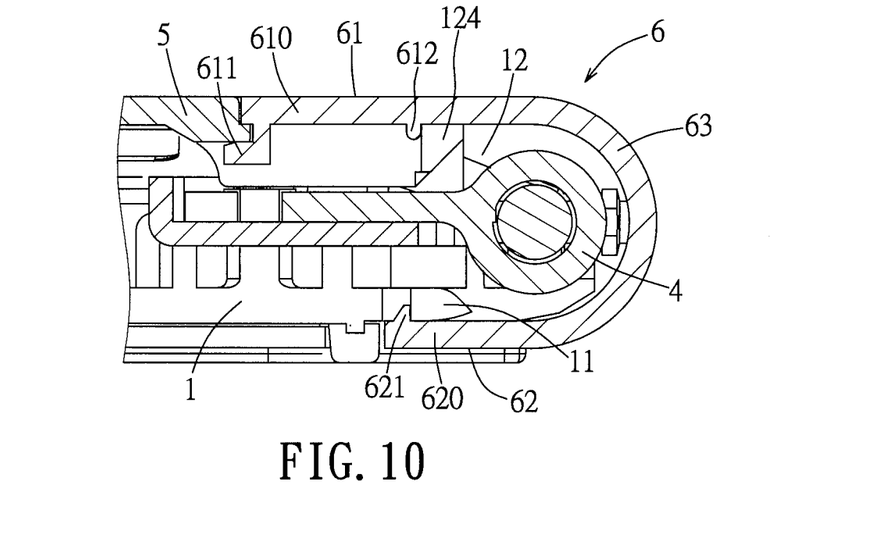
FIG. 10 is a fragmentary sectional view of the touch control display apparatus for illustrating the assembly relationship between the decorating cover plate, the bottom case and the frame member.
Figure 11:
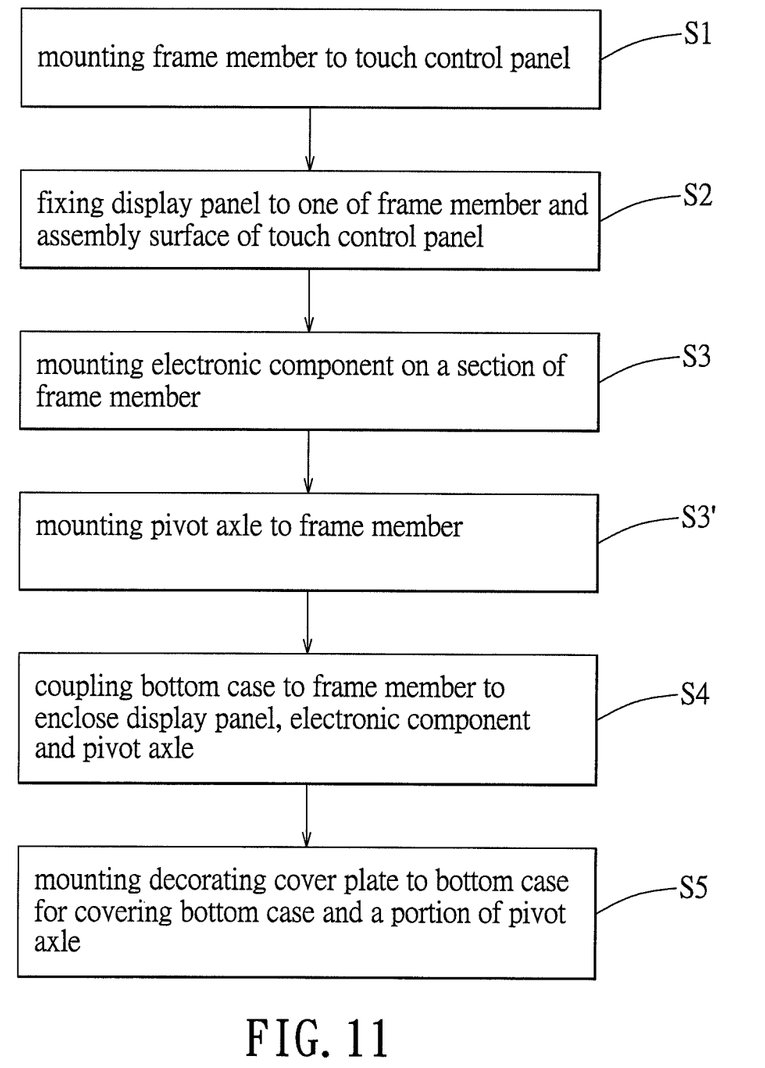
FIG. 11 is a flowchart diagram for illustrating the steps of the method.

Referring to FIG. 11, in addition to FIGS. 3 to 10, the preferred embodiment of a method for assembling a touch control display apparatus 100 according to the present invention is shown to include the following steps.

Figure 1:
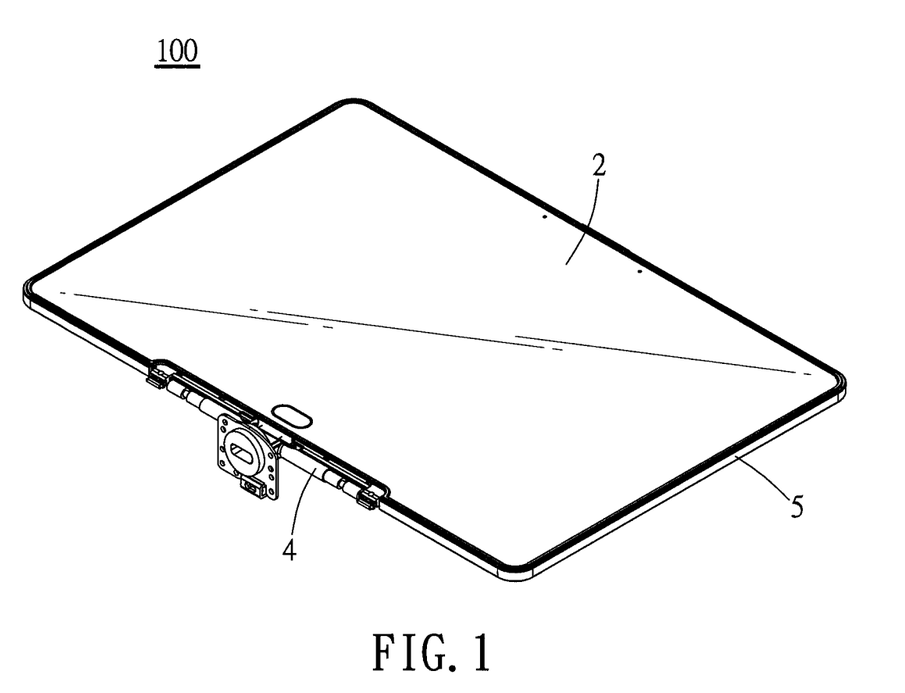
FIG. 1 is a perspective view of the preferred embodiment of a touch control display apparatus according to the present invention without a decorating cover plate.
Figure 2:
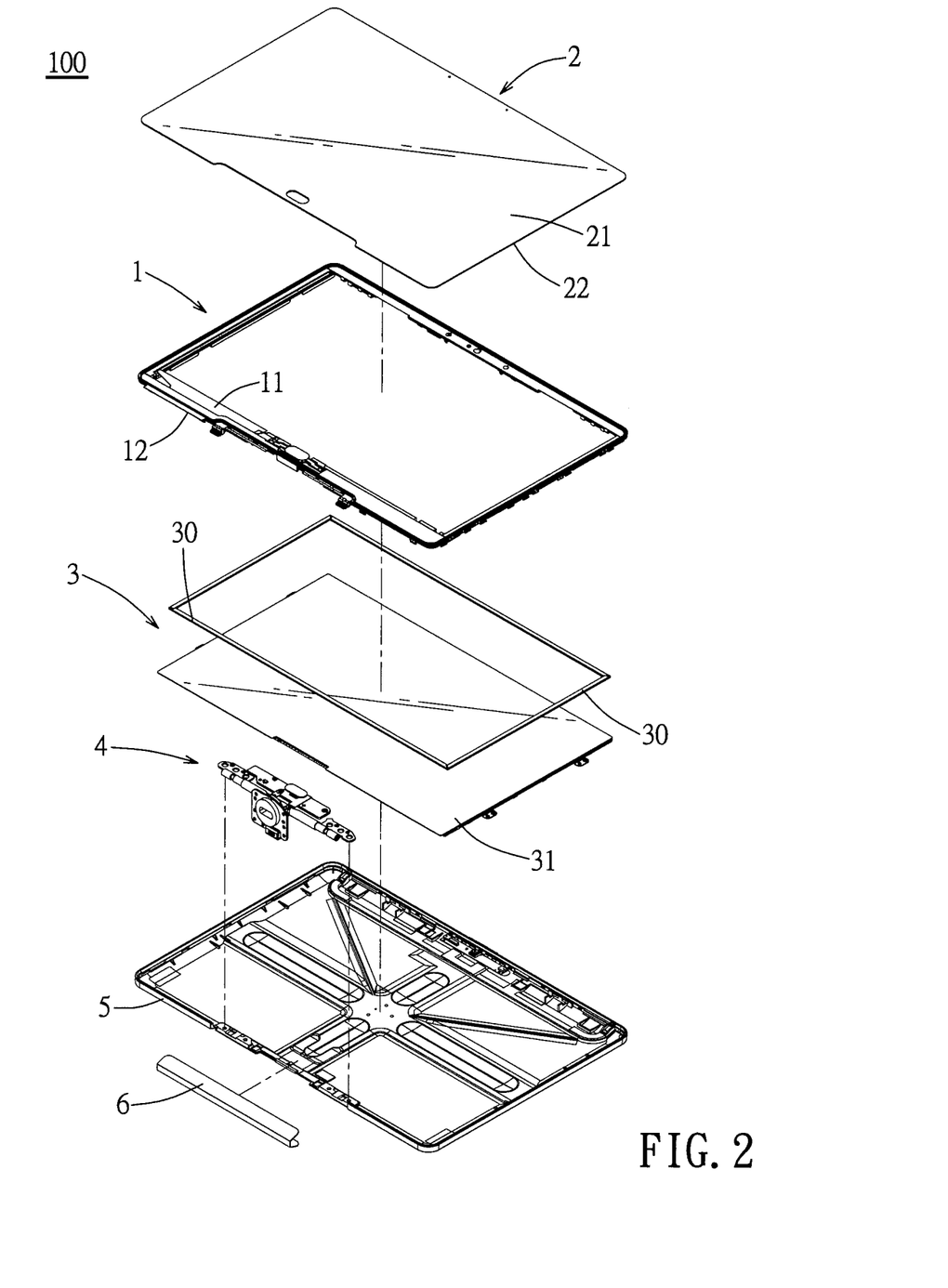
FIG. 2 is an exploded perspective view for illustrating the main components of the touch control display apparatus.
Figure 3:
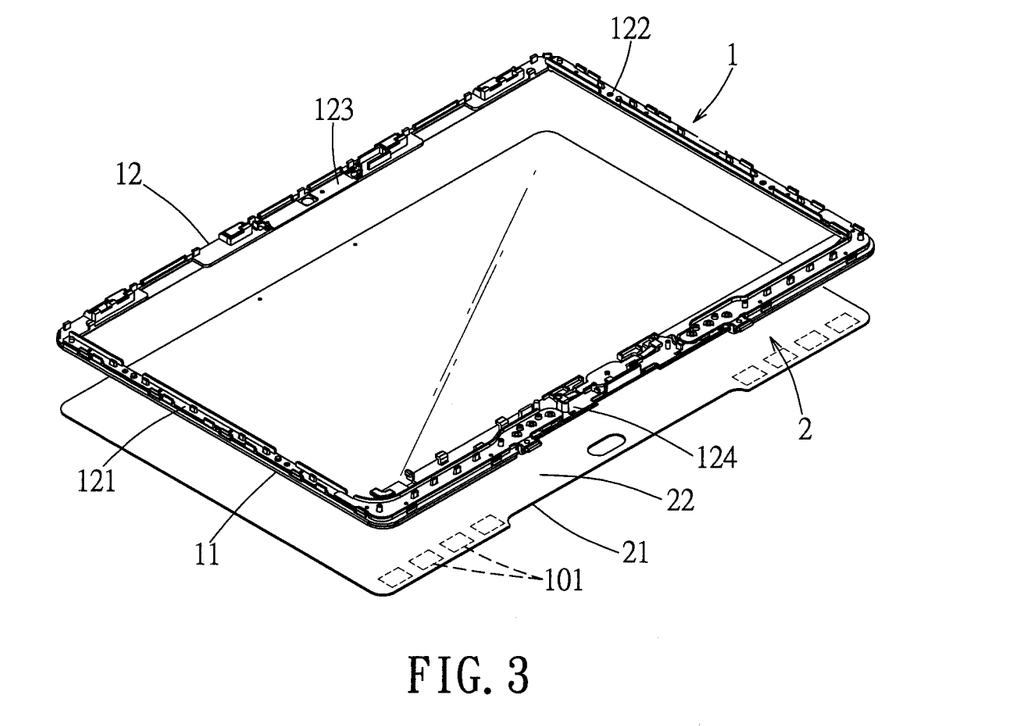
FIG. 3 is a fragmentary exploded perspective view of the touch control display apparatus for illustrating a step of aligning and gluing a touch control panel and a frame member of the embodiment of a method for assembling a touch control display apparatus according to the present invention.

First, in step (S1), as shown in FIG. 3, an adhesive material 101 is provided between the frame member 1 and the assembling surface 22 of the touch control panel 2. The adhesive material 101 may be applied onto the outer surface 11 of the frame member 1 or the assembly surface 22 of the touch control panel 2. The frame member 1 is then aligned with and mounted to the assembly surface 22 of the touch control panel 2, thus integrating the two components as one piece. In this embodiment, the adhesive material 101 may be any appropriate gluing material.

Figure 4:
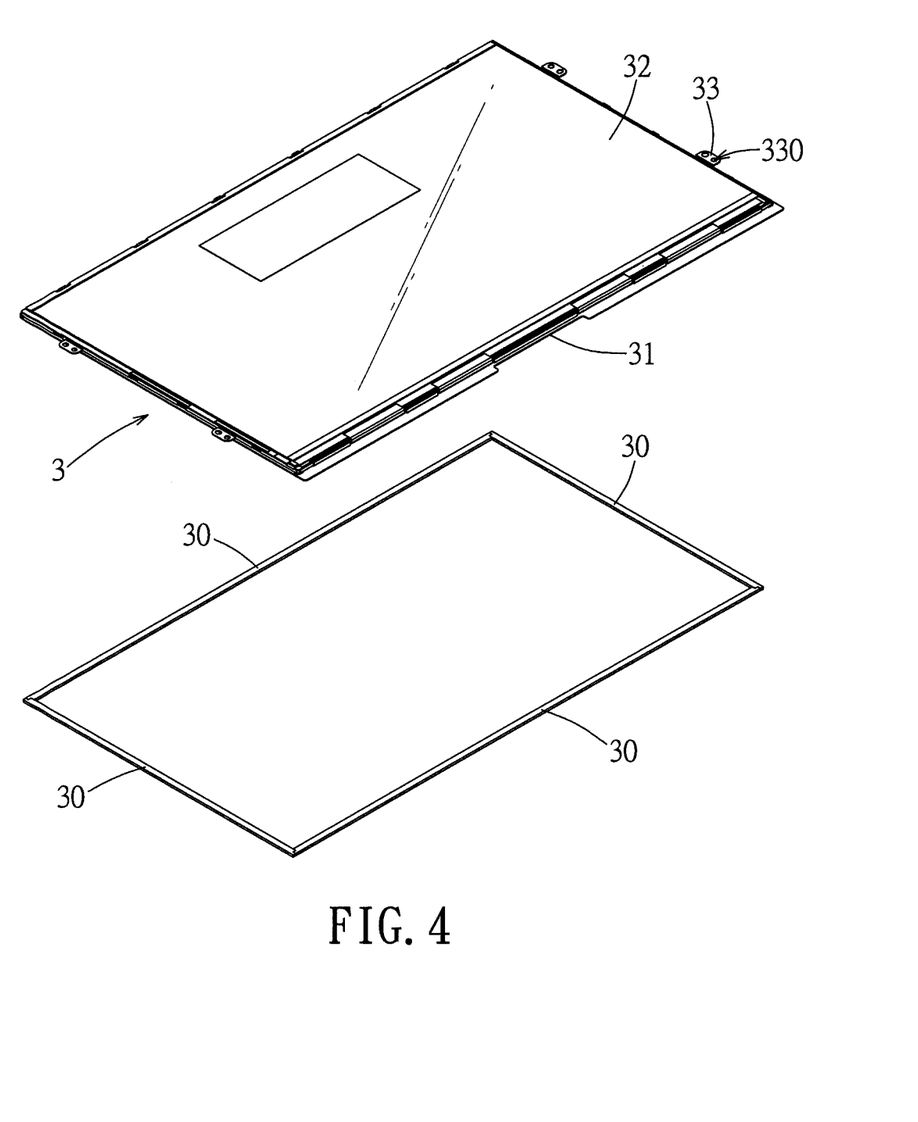
FIG. 4 is a fragmentary exploded perspective view of the touch control display apparatus for illustrating four adhesive buffer strips fixed to a display panel.
Figure 5:
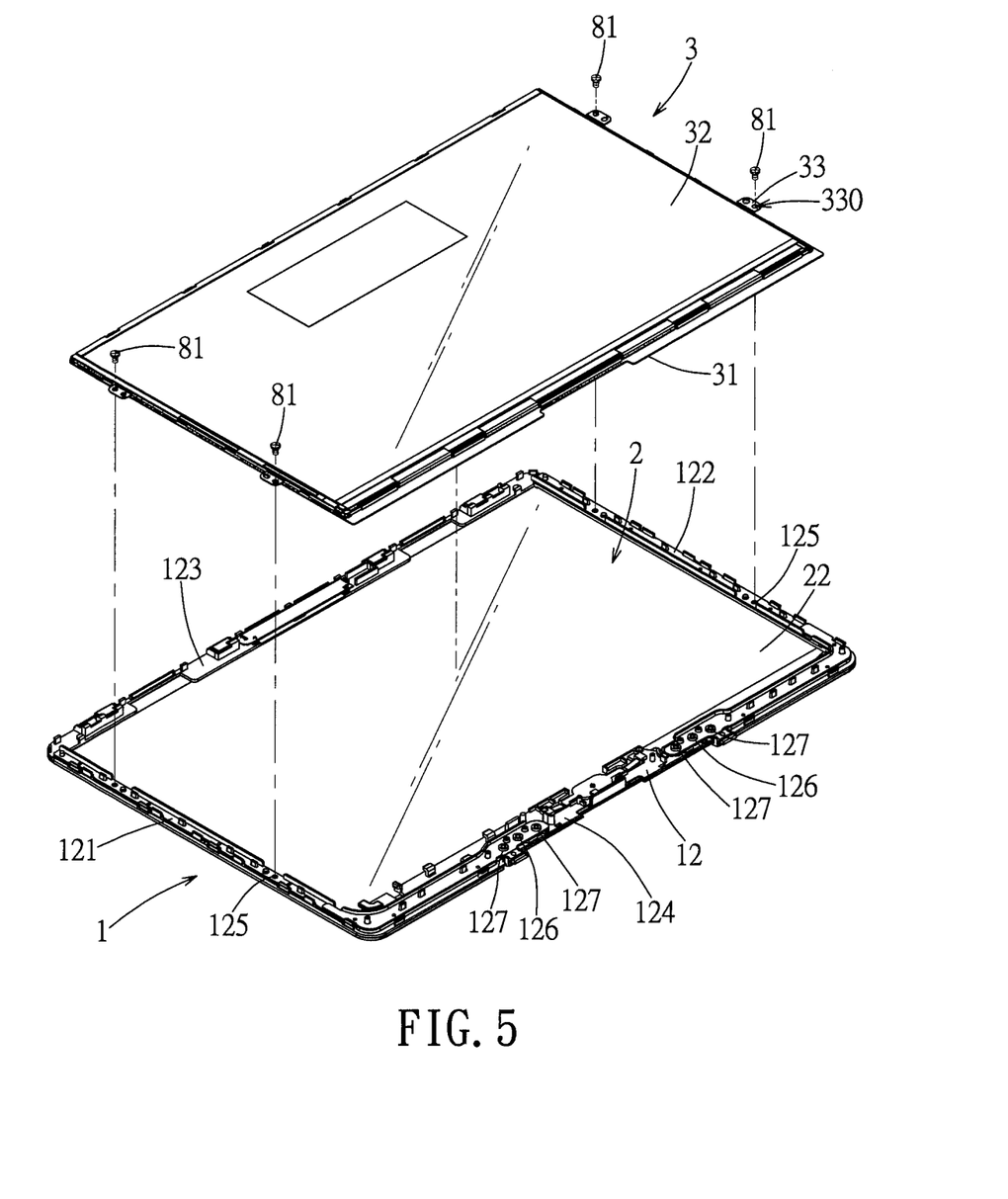
FIG. 5 is a fragmentary, partly exploded perspective view of the touch control display apparatus for illustrating a step of coupling the display panel to an assembly surface of the frame member and the touch control panel of the assembly method.

Next, in step (S2), as shown in FIG. 4, four adhesive buffering strips 30 are mounted on four corresponding lateral sides of the display surface 31 of the display panel 3. After removing the anti-adhesive paper from the adhesive buffering strips 30, the display panel 3 is disposed with the display surface 31 facing the touch control panel 2 (see FIG. 5), and the adhesive of the buffering strips 30 is used to adhere and fix the display surface 31 to the assembly surface 22 of the touch control panel 2. Alternatively, the display surface 31 can be adhered to an inner periphery of the frame member 1. Moreover, with regard to the assembly between the display panel 3 and the frame member 1, the display surface 31 disposed to abut against the touch control panel 2, a plurality of fixing members 81, which are in the form of screws in this embodiment, are then placed to extend into a plurality of screw holes 330 formed respectively in a plurality of fixing pieces 33 that are provided on a periphery of the display panel 3, and further into a plurality of threaded holes 125 formed in the first and second sections 121, 122 of the frame member 1 and respectively registered with the screw holes 330, such that the display panel 3 is fixed to the frame member 1. As a result the display panel 3, the touch panel 2 and the frame member 1 are bonded together as one piece. Herein, a portion of the display panel 3 other than the fixing pieces 33 is confined by the frame member 1. It is noted herein that each of the fixing pieces 33 may be formed with more than one screw hole 330.

Figure 6:
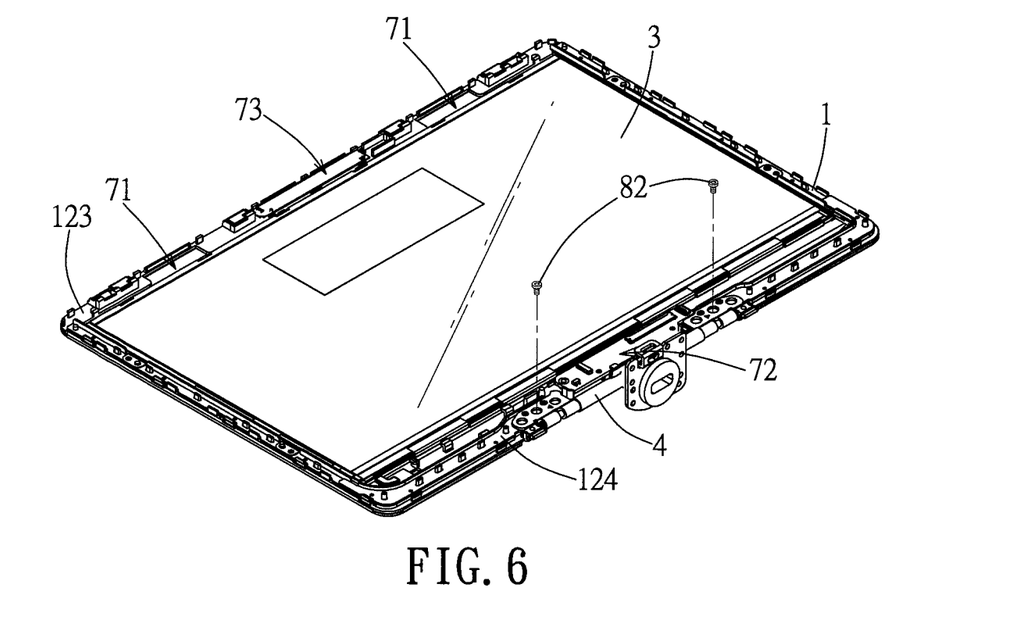
FIG. 6 is a fragmentary, partly assembled perspective view of the touch control display apparatus for illustrating a step of mounting a pivot axle to the frame member of the assembly method.
Figure 7:
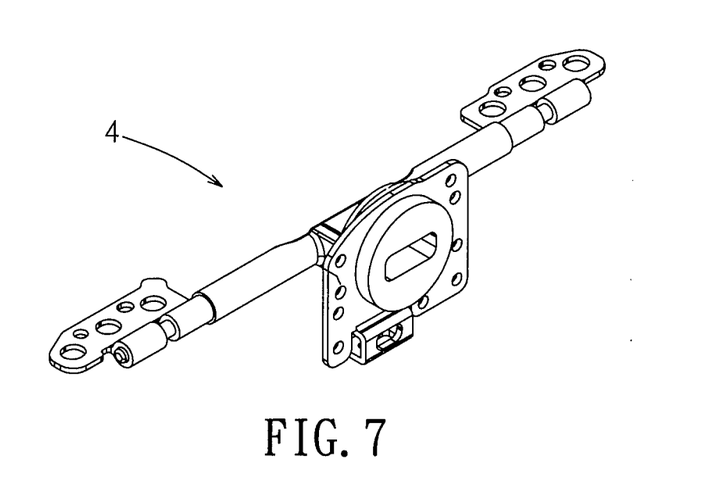
FIG. 7 is an enlarged perspective view of the pivot axle.

Next, in step (S3), as shown in FIG. 6, the antennas 71, the circuit board 72 and the CCD camera 73 are mounted on the uncovered third and fourth sections 123, 124 of the inner surface 12 of the frame member 1. Thus, the electronic components are not covered by the display panel 3.

Next, in step (S3'), as shown in FIG. 6, the pivot axle 4 is mounted to the frame member 1 by fasteners 82 that extend through the pivot axle 4 and that engage respectively with the threaded holes 126 (shown in FIG. 5) formed in the fourth section 124 of the inner surface 12 of the frame member 1. The pivot axle 4 is used to pivotably connect the touch control display apparatus 100 to a base (not shown) of a computer host, thus turning into a notebook computer. However, since the feature of this invention does not reside in the design of the pivot connection, further details of the same are omitted herein. Up to now, the frame member 1, the touch control panel 2, the display panel 3, the pivot axle 4 and the relevant electronic components are bonded together.

Figure 8:
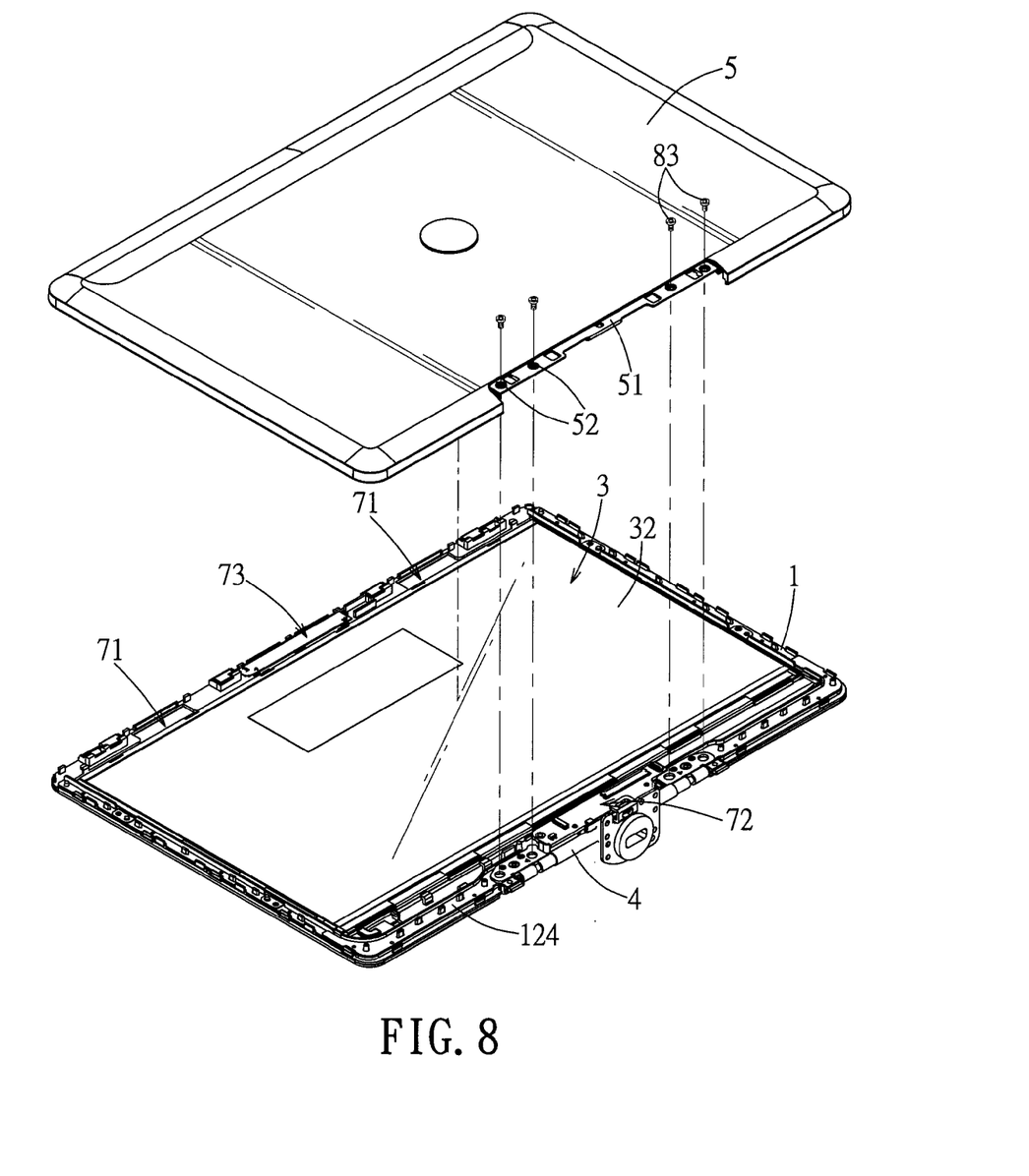
FIG. 8 is a fragmentary, partly exploded perspective view of the touch control display apparatus for illustrating a step of fixing a bottom case to the pivot axle of the assembly method.

As shown in FIG. 8, the bottom case 5 has an assembly portion 51 that corresponds in position to a fixing portion of the pivot axle 4 at the fourth section 124 of the frame member 1, where the assembly portion 51 is formed with a recess so that at least one portion of the pivot axle 4 is exposed from the recess, and is formed with a plurality of screw holes 52.

In step (S4), the bottom case 5 is coupled and locked to the frame member 1 and the pivot axle 4 by a plurality of locking members 83 that extend through the screw holes 52 and a plurality of threaded holes 127 formed in the fourth section 124 of the frame member 1 so as to enclose the display panel 3, and the relevant electronic components with a portion of the pivot axle 4 exposed from the bottom case 5.

Finally, in step (S5), as shown in FIGS. 9 and 10, the decorating cover plate 6 is mounted for covering the assembly portion 51 of the bottom case 5 and the at least one portion of the pivot axle 4 that is exposed from the bottom case 5 so as to maintain the smoothness and integrality of the bottom case 5. In detail, the decorating cover plate 6 includes a first joint section 61 for engaging the bottom case 5, a second joint section 62 for engaging the frame member 1, and a connecting section 63 that interconnects the first and second joint sections 61, 62.

The first joint section 61 of the decorating cover plate 6 has a main plate portion 610, an L-shaped limiting hook 611 protruding from an inner side of the main plate portion 610 adjacent to an edge of the main plate portion 610, and a limiting protrusion 612 protruding from the inner side of the main plate portion 610, spaced apart from the L-shaped limiting hook 611 and disposed proximate to the connecting section 63. The L-shaped limiting hook 611 abuts against an outer edge of the assembly portion 51 of the bottom case 5 and cooperates with the main plate portion 610 to clasp the outer edge, thereby restricting the decorating cover plate 6 from moving in a top-down direction transverse to the bottom case 5, relative to the display panel 3 (see FIG. 2). The limiting protrusion 612 abuts against the fourth section 124 of the inner surface 12 of the frame member 1 with a surface closer to the connecting section 63, thereby preventing the decorating cover plate 6 from moving in a direction transverse to the top-down direction and opposite to a mounting direction of the decorating cover plate 6.

On the other hand, the second joint section 62 has a main plate portion 620, and an engaging block 621 protruding from an inner side of the main plate portion 620. The side of the engaging block 621 that is proximate to the connecting section 63 abuts against the outer surface 11 of frame member 1 for serving the same purpose as the limiting protrusion 612. With this configuration, the decorating cover plate 6 is engaged with the bottom case 5 and the frame member 1 through structural interference.

For the touch control display apparatus 100 assembled by using the assembly method according to the present invention, if defects are found during the assembly process, or during use, requiring replacement or maintenance of the electronic components such as the antennas 71, the circuit board 72 and the CCD camera 73, etc., one simply needs to remove the decorating cover plate 6 and the bottom case 5 in sequence for the electronic components to be accessible without the need for removal of the touch control panel 2 and the display panel 3 as with the prior art, thereby simplifying the dismantling and maintenance procedures. Moreover, a clean room environment is no longer needed for maintenance or replacement of the electronic components, which leads to significant cost reduction.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for assembling a touch control display apparatus, comprising the steps of:
   (S1) mounting a frame member to an assembly surface of a touch control panel;
   (S2) fixing a display panel to one of the frame member and the assembly surface of the touch control panel such that a display surface of the display panel faces the touch control panel;
   (S3) mounting at least one electronic component on a section of the frame member that is not covered by the display panel;
   (S3') mounting a pivot axle on a section of the frame member; and
   (S4) coupling a bottom case to the frame member for enclosing the display panel and the at least one electronic component, wherein the bottom case has an assembly portion that corresponds in position to a fixing portion of the pivot axle, and the assembly portion is formed with a recess so that at least one portion of the pivot axle is exposed from the recess in step (S4).

2. The method of claim 1, an adhesive material being provided between the frame member and the assembly surface of the touch control panel, wherein, in step (S1), the frame member is adhered to the assembly surface of the touch control panel via the adhesive material.

3. The method of claim 1, at least one adhesive buffering strip being mounted on at least one lateral side of the display surface of the display panel, wherein, in step (S2), the display panel is fixed to the one of the frame member and the assembly surface of the touch control panel via the adhesive buffering strip.

4. The method of claim 1, the display panel being provided with a plurality of fixing pieces at a periphery thereof, wherein, in step (S2), the fixing pieces of the display panel are fixed to the frame member via a plurality of fixing members.

5. The method of claim 4, the fixing members being configured as screws, each of the fixing pieces being formed with at least one screw hole, the frame member being formed with a plurality of threaded holes, each of the threaded holes being registered with a respective one of the screw holes, wherein, in step (S2), each of the fixing members extends through a respective one of the screw holes and a respective one of the threaded holes such that the display panel is fixed to the frame member and that a portion of the display panel other than the fixing pieces is confined by the frame member.

6. The method of claim 1, further comprising, after step (S4), a step (S5) of mounting a decorating cover plate for covering the assembly portion of the bottom case and the at least one portion of the pivot axle that is exposed from the bottom case.

7. The method of claim 6, the decorating cover plate including a first joint section, a second joint section, and a connecting section that interconnects the first and second joint sections, wherein, in step (S5), the first joint section engages the bottom case, and the second joint section engages the frame member.

8. The method of claim 1, wherein, in step (S4), the bottom case, the pivot axle and the frame member are locked together through at least one locking member.

9. A touch control display apparatus comprising:
   a frame member;
   a touch control panel having an assembly surface that is mounted to said frame member;
   a display panel having a display surface that faces said touch control panel and that is fixed on one of said assembly surface of said touch control panel and said frame member;
   at least one electronic component mounted on a section of said frame member that is not covered by said display panel;
   a pivot axle mounted on a section of said frame member; and
   a bottom case coupled to said frame member for enclosing said display panel and said at least one electronic component, wherein said bottom case includes an assembly portion that corresponds in position to a fixing portion of said pivot axle, said assembly portion being formed with a recess so that at least one portion of the pivot axle is exposed from said recess.

10. The touch control display apparatus as claimed in claim 9, further comprising an adhesive material disposed between said frame member and said assembly surface of said touch control panel for adhering said frame member and said touch control panel.

11. The touch control display apparatus as claimed in claim 9, further comprising at least one adhesive buffer strip mounted on at least one lateral side of said display surface of said display panel for adhesion of said display panel to the one of said assembly surface of the touch control panel and said frame member.

12. The touch control display apparatus as claimed in claim 9, wherein said display panel is provided with a plurality of fixing pieces disposed on a periphery thereof, said touch control display apparatus further comprising at least one fixing member for fixing said fixing plates of said display panel to said frame member.

13. The touch control display apparatus as claimed in claim 12, wherein:
   said fixing members are screws;
   each of said fixing plates of said display panel being formed with at least one screw hole;
   said frame member being forming with a plurality of threaded holes that are registered respectively with said screw holes such that each of said fixing members extends through a respective one of said screw hole and a respective one of said threaded holes for fixing said display panel to said frame member, a portion of said display panel other than said fixing pieces being confined by said frame member.

14. The touch control display apparatus as claimed in claim 9, wherein said electronic component is one of an antenna, a circuit board, and a CCD camera.

15. The touch control display apparatus as claimed in claim 9, further comprising a decorating cover plate for covering said assembly portion of said bottom case and said at least one portion of said pivot axle that is exposed from said bottom case.

16. The touch control display apparatus as claimed in claim 15, wherein said decorating cover plate includes a first joint section for engaging said bottom case, a second joint section for engaging said frame member, and a connecting section interconnecting said first and second joint sections.

17. The touch control display apparatus as claimed in claim 9, further comprising at least one locking member for locking said bottom case, said pivot axle and said frame member together.

\* \* \* \* \*